United States Patent
Kraft et al.

(10) Patent No.: US 9,800,712 B2
(45) Date of Patent: Oct. 24, 2017

(54) MESSAGING IN A MOBILE COMMUNICATION TERMINAL

(75) Inventors: Christian Kraft, Frederiksberg C (DK); Peter Nielsen, Lyngby (DK)

(73) Assignee: Nokia Technologies Oy, Espoo (FI)

( * ) Notice: Subject to any disclaimer, the term of this patent is extended or adjusted under 35 U.S.C. 154(b) by 844 days.

(21) Appl. No.: 11/259,733

(22) Filed: Oct. 26, 2005

(65) Prior Publication Data
US 2007/0090923 A1 Apr. 26, 2007

(51) Int. Cl.
*H04M 1/725* (2006.01)

(52) U.S. Cl.
CPC .............................. *H04M 1/72552* (2013.01)

(58) Field of Classification Search
CPC . H04M 1/72552; G06Q 10/107; G06Q 40/04; H04L 67/12
USPC ...... 455/412.1, 412.2, 466, 566, 403, 422.1, 455/445, 435.1; 370/7.52; 379/67.1, 379/88.13, 88.15; 715/751, 752
See application file for complete search history.

(56) References Cited

U.S. PATENT DOCUMENTS

| | | | |
|---|---|---|---|
| 5,533,110 A * | 7/1996 | Pinard et al. | 379/355.01 |
| 5,579,472 A * | 11/1996 | Keyworth et al. | 715/751 |
| 6,032,053 A | 2/2000 | Schroeder et al. | 455/553 |
| 6,874,012 B1 * | 3/2005 | St. Pierre | 709/207 |
| 6,959,207 B2 * | 10/2005 | Keinonen et al. | 455/567 |
| 6,992,991 B2 * | 1/2006 | Duske et al. | 370/316 |
| 7,079,871 B2 | 7/2006 | Kim | |
| 7,269,793 B2 * | 9/2007 | Horsfall et al. | 715/751 |
| 7,328,031 B2 * | 2/2008 | Kraft | 455/466 |
| 2002/0015061 A1 | 2/2002 | Maguire | |
| 2003/0139206 A1 | 7/2003 | Kim | |
| 2004/0110491 A1 | 6/2004 | Ozaki | |
| 2004/0192263 A1 * | 9/2004 | Tomikawa et al. | 455/413 |
| 2005/0160451 A1 * | 7/2005 | Batra et al. | 725/37 |
| 2005/0210146 A1 | 9/2005 | Shimizu | |
| 2006/0084450 A1 * | 4/2006 | Dam Nielsen et al. | 455/466 |
| 2006/0129943 A1 * | 6/2006 | Maguire | 715/751 |
| 2007/0033255 A1 * | 2/2007 | Sanjeeva et al. | 709/206 |

FOREIGN PATENT DOCUMENTS

| | | |
|---|---|---|
| JP | 2003-283608 | 3/2003 |
| JP | 2003-108486 | 11/2003 |
| JP | 2004-341778 | 2/2004 |
| KR | 2002-0008256 | 1/2002 |

(Continued)

OTHER PUBLICATIONS

Korean Office Action dated Mar. 20, 2009.

(Continued)

*Primary Examiner* — Myron K Wyche
(74) *Attorney, Agent, or Firm* — Alston & Bird LLP

(57) ABSTRACT

Controlling message handling in a mobile communication terminal. A message creation procedure is initiated followed by assigning a destination address to a message. Message content for the message is recorded and subsequent to the assignment of the destination address, a message received from an originating address is recognized. The originating address of the received message is compared with the destination address of the message being recorded. In a case where the comparison results in that the originating address is equal to the destination address the received message is displayed.

18 Claims, 3 Drawing Sheets

(56) References Cited

FOREIGN PATENT DOCUMENTS

| KR | 2003-62850 | 9/2003 |
|---|---|---|
| KR | 10-2005-0008328 | 1/2005 |
| WO | WO 2004/040461 A1 | 5/2004 |

OTHER PUBLICATIONS

Japanese Office Action dated Jul. 20, 2010.
Japanese Office Action dated May 17, 2011.
Communication from European Patent Application No. 06820802.4 dated Jan. 27, 2016.
International Search Report and Written Opinion from International Patent Application No. PCT/IB2006/002990 dated Mar. 14, 2007.
Office Action from European Patent Application No. 06820802.4 dated Jan. 25, 2017.

\* cited by examiner

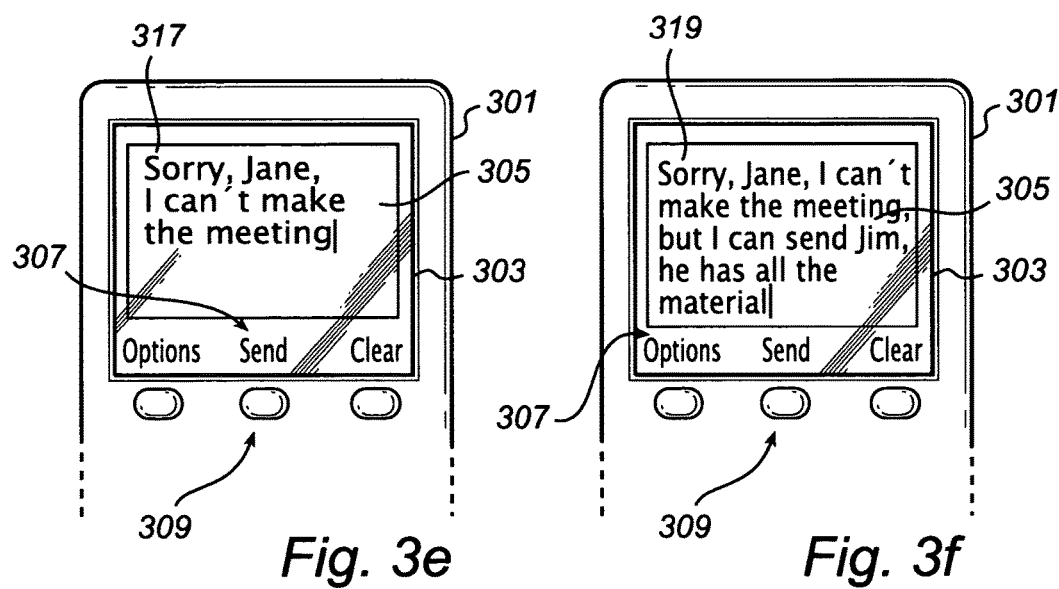

though the user is currently replying is currently received, the recognition of a received message may involve receiving the recognized message during the recording of
MESSAGING IN A MOBILE COMMUNICATION TERMINAL

FIELD OF THE INVENTION

The present invention relates to a method for controlling message handling in a mobile communication terminal, a mobile communication terminal and a computer program performing such a method.

BACKGROUND

Many, especially young, mobile phone users today use their mobile communication terminals more as a tool for sending text messages than as a voice communication device. A typical use case for such users is to perform "chat sessions" with another user, during which, typically, a very large number of messages are sent/received to and from that person. These sessions of multiple exchange of messages are not necessarily synchronized. That is, the case may well be that one user sends two messages rapidly, one after another before the other user has had time to send a reply message. Current handling of such situations in most prior art communication terminals does typically not support an optimized handling for this; if the user receives a new message from the person when replying to a previous message, there is no easy way to see the new message and to, e.g., include a reply to the most recently received message.

Not only these users that perform such "chat sessions", but also more "traditional" users of message services may often receive multiple messages from one and the same other party—and within a very short time. However, replying to multiple messages is typically very cumbersome, especially if the procedure of recording a reply has already been initiated when a second and third (etc.) message are received from that other party.

When receiving a new message, for example an SMS within the framework of GSM or UMTS, from one and the same sender when replying to a message, the user will need to first exit a message reply editor, then read the newly received message (which may not even be from the same sender), and finally, the user will need to re-enter the message reply editor to continue the reply procedure. Typically, in this situation, the original reply-address (typically a mobile phone number) is removed from view and the user will have to find the number manually, due to the fact that, typically, the reply address/number is only kept as long as the message reply editor is active.

SUMMARY OF THE INVENTION

An object of the present invention is to overcome drawbacks related to prior art message handling as discussed above. This object is achieved in different aspects by way of a method, a terminal and a computer program according to the appended claims.

Hence, in a first aspect, there is provided a method for controlling message handling in a mobile communication terminal. The method commences with initiating a message creation procedure, followed by assigning a destination address to a message and recording message content for the message. Subsequent to the assignment of the destination address, a message received from an originating address is recognized. This is then followed by a comparison of the originating address of the received message with the destination address of the message being recorded. In a case where the comparison results in that the originating address is equal to the destination address, the received message is then displayed.

The recognition of a received message may involve receiving the recognized message during the recording of message content. The recognition of a received message may also involve recognition of a message already received. In other words, previously received messages already present in an "inbox" may be checked if they originate from an address that correspond to the address being considered as a destination address.

The displaying of the received message may be performed in response to a user confirmation action received in response to a prompting signal. Such a prompting signal may include audio signals as well as visual signals.

Hence, message handling is advantageously made user friendly. It reduces the number of operations that a user needs to perform during, e.g., a "chat session" during which many messages are exchanged and where message transmission is not synchronized between the users. Moreover, this advantage is further emphasized when considering that it allows the user to combine replies to two or more received messages into a single reply message. Thereby, the invention provides improved interaction between the message exchanging parties.

In an embodiment, the initiation of the message creation procedure may entail initiating a reply procedure for replying to a received message from an originating address. The assignment of the destination address may take place during this initiating procedure where the originating address is assigned to the destination address.

Embodiments also include that message content that is being recorded may be displayed in a first display area of the mobile communication terminal, and the received message may also be displayed in the first display area. Thereby the displayed message content will be replaced with the received message content. Alternatively, the message content of the received message is erased from the first display area, and the message content being recorded in the first display area is then re-displayed and the erasing may be initiated in response to a signal generated as a result of user input.

The message content being recorded is in other embodiments displayed in a first display area of the mobile communication terminal and the received message is displayed in a second display area.

In another aspect there is provided a mobile communication terminal comprising control and communication means that are configured to perform a method, and which provide the advantages, as discussed above, and in yet another aspect there is provided a computer program comprising computer readable software instructions capable of performing such a method.

Hence, in somewhat other words, the invention allows a user to see messages immediately when they are received from a person to which the user is currently replying (or sending) a message to.

The message handling may thus be summarized as follows:

A user has received a message, and has started replying to that message. If a new message is received from the party sending the received message, this newly received message will then pop-up automatically in the reply-message editor (i.e. in a display area of the terminal display).

The method also handles a situation where the user has, e.g., manually chosen a recipient addressee to send a message to (e.g. when the user from an address book, contacts list etc. has found an address/phone number and chosen a "Send message" command or, in a user interface with form fields, when user has fetched an addressee to the To-field in the message editor). Also in this case, any messages from that addressee will pop up in the display area of the message editor.

It is to be noted that not all messages that are received will "pop-up" when the user is operating the terminal using a message editor, but only to pop-up those messages that is relevant to the user at the specific point in time, i.e. during a session where messages are exchanged with one other communicating party.

It is to be understood that the invention is relevant with respect to SMS message handling as well as MMS message handling in any GSM/GPRS/UMTS communication system, as well as any other message handling in other types of mobile communication systems.

BRIEF DESCRIPTION OF THE DRAWINGS

FIGS. 3a-f illustrate the appearance of a display area of a terminal during operation of the method of FIG. 2.

PREFERRED EMBODIMENTS

Figure 1:
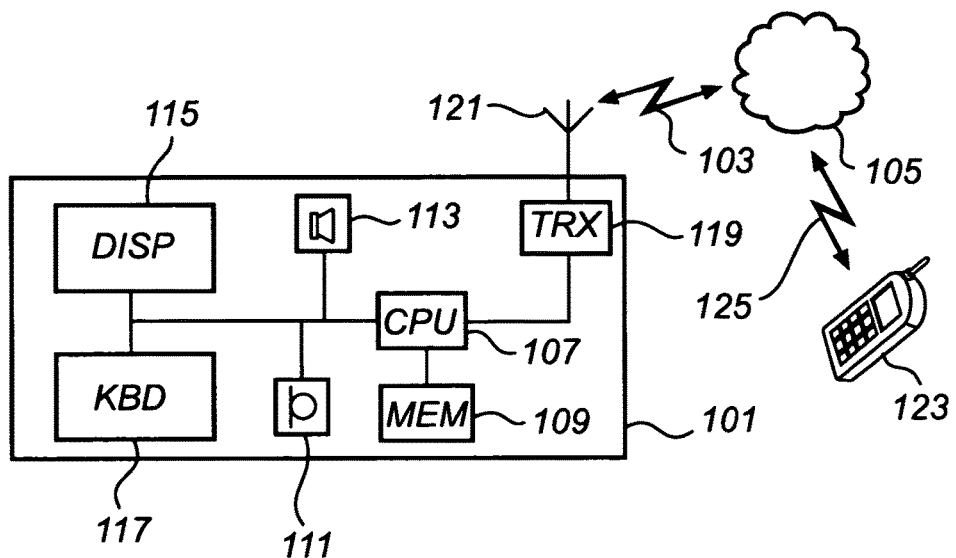
FIG. 1 shows schematically a block diagram of a communication terminal according to the present invention.

FIG. 1 illustrates schematically a communication terminal 101 in which the present invention is implemented. The terminal 101 is capable of communication via an air interface 103 with a radio communication system 105 such as the well known systems GSM/GPRS, UMTS, CDMA 2000 etc. The terminal comprises a processor 107, memory 109 as well as input/output units in the form of a microphone 111, a speaker 113, a display 115 and a keyboard 117. Radio communication is realized by radio circuitry 119 and an antenna 121. The details regarding how these units communicate are known to the skilled person and is therefore not discussed further.

The communication terminal 101 may for example be a mobile telephone terminal or a PDA equipped with radio communication means. The method according to the present invention will in general reside in the form of software instructions, together with other software components as described in connection with FIG. 1, in the memory 109 of the terminal. The software instructions of the inventive notification function may be provided into the memory 109 in a number of ways, including distribution via the network 105 from a software supplier 123.

Figure 2:
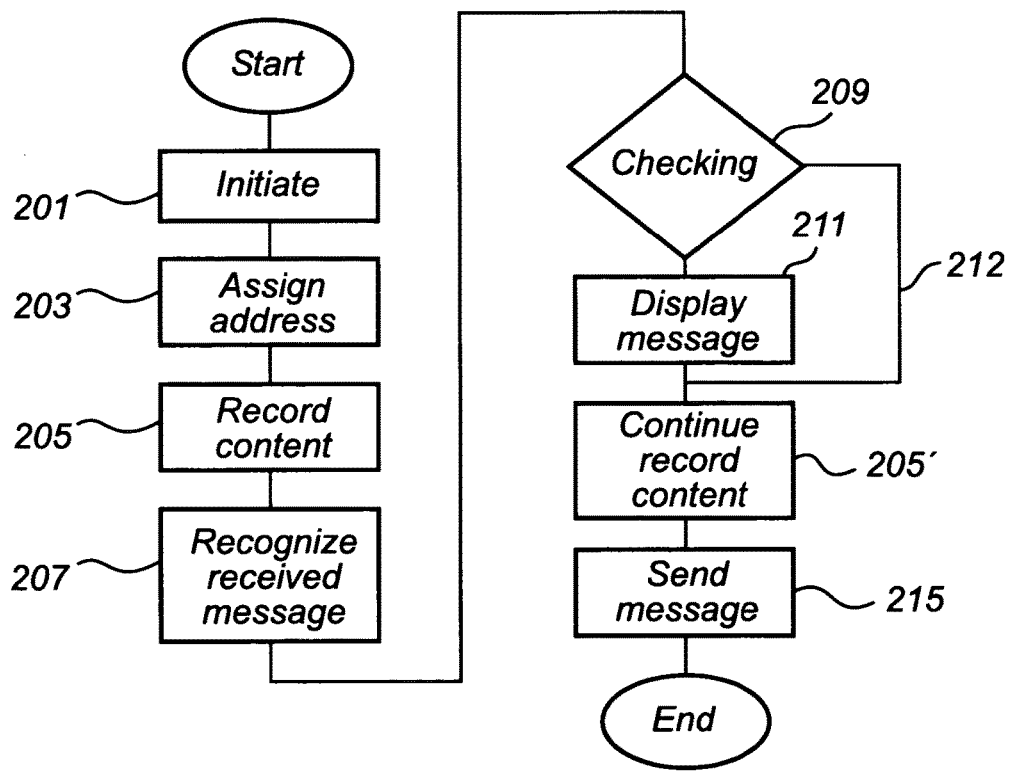
FIG. 2 is a flow chart illustrating a number of steps of a method according to the present invention.

Turning now to FIGS. 2 and 3a-f, a method according to the invention will be described in terms of a number of steps to be taken by controlling software in a terminal such as the terminal 101 described above in connection with FIG. 1. FIG. 2 is a flow chart of the method and FIGS. 3a-f depict a terminal 301 having a display 303. A user interacts with the terminal 301 using so-called soft keys as illustrated in FIGS. 3a-f by way of three keypad keys 309 located below the display 303. Soft key labels 307 are displayed along the lower edge of the display 303 and indicate specific operations that are to be executed by the terminal controller when the corresponding (i.e. most adjacent) keypad key 309 is pressed. Here the soft key labels 307 include "Options", "Reply", "Back", "Send", "OK" etc. The detailed description of these will be kept at a minimum here since their use is well known to a person skilled in the art.

Figures 3A, 3B:
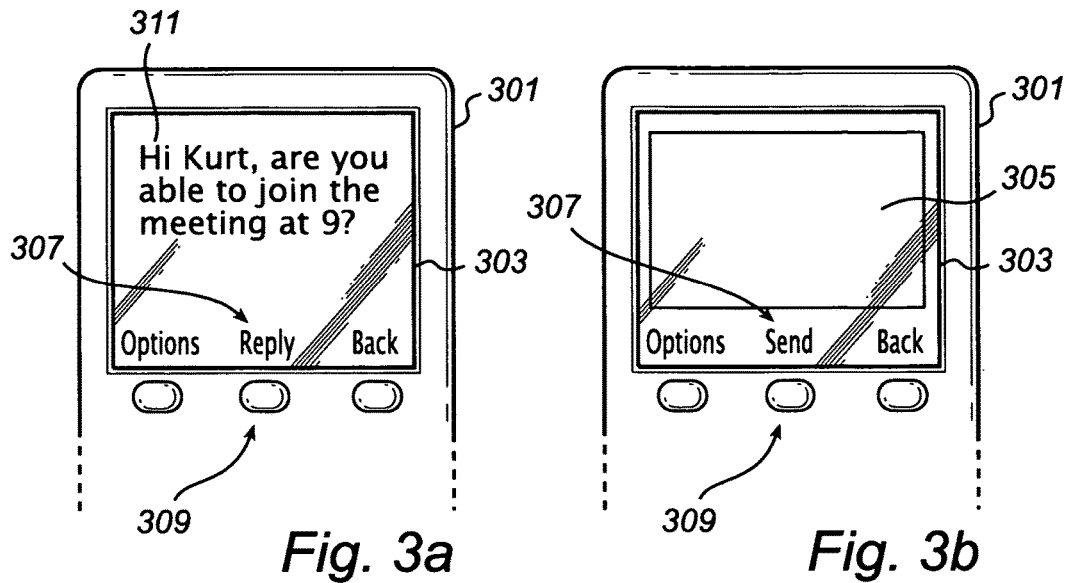

FIG. 3a illustrates a situation where a user of the terminal 301 is reading a short message text 311 that has been previously received and displayed on the display 303 by use of known operations.

When reading the text 311, the user decides to make a reply to the message and by pressing one of the keys 309 an initiation step 201 is performed. The initiation step 201 includes erasing the displayed text 311 from the display 303 and, as illustrated in FIG. 3b, presenting a display area 305 in which reply text input by the user is to be presented, as will be shown below. At this stage, an address assignment step 203 also takes place, during which the recipient, i.e. a destination address, of the reply message is assigned. Typically, the address of the destination is a mobile phone number, as the skilled person will realize. In an alternative embodiment, the address assignment step 203 may involve entering any address as the destination, irrespective of whether or not a previous message has been received.

Figures 3C, 3D:
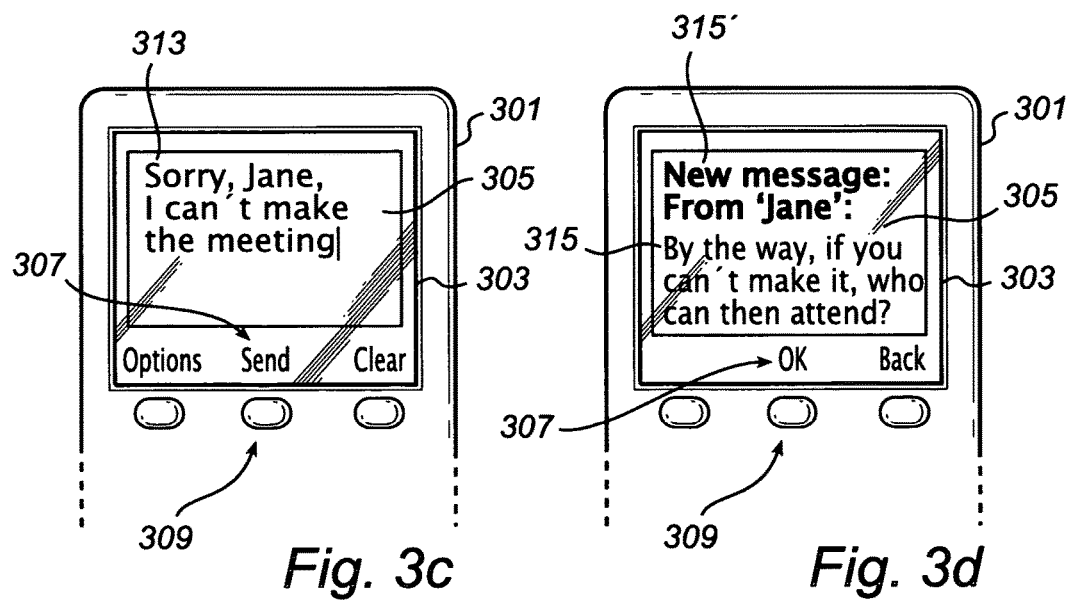

Then a record content step 205 is performed, during which the user types a reply text 313, which is displayed in the display area 305 as illustrated in FIG. 3c.

During the record content step 205, or at least subsequent to the address assignment step 203, a received message is recognized in a recognition step 205. The recognition of the received message may involve receiving the recognized message during the recording of message content. The recognition of a received message may also involve recognition of a message already received. In other words, previously received, and preferably unread, messages already present in an "inbox" may be checked if they originate from an address that correspond to the address being considered as a destination address.

The message that was recognized, i.e. either received during the record content step 205 or recognized as already received, is analyzed in a checking step 209 during which the originating address of the received message is compared with the destination address assigned during the address assignment step 203.

In case the comparison step 209 results in a finding that the originating address of the message received during the reception step 207 is equal to the destination address of the message being recorded, the received message is displayed in a display step 211. As shown in FIG. 3d, content 315 as well as information 315' regarding the origin of the received message is displayed in the display area 305, replacing the previously displayed content of the display area 305.

The displaying of the received message may be performed in response to a user confirmation action received in response to a prompting signal. Such a prompting signal may include audio signals as well as visual signals. For example, the information 315' may be replaced by a prompter asking the user to press a key 309 to confirm that the received message is to be displayed.

In case the comparison step 209 results in a finding that the originating address of the message received during the reception step 207 is not equal to the destination address of the message being recorded, the received message is not displayed, as indicated by reference numeral 212 in FIG. 2.

The user is at this point in time aware of the content of the recently received message (or otherwise recognized message) from the originating address, i.e. from the same person to whom the reply message is in the process of being recorded, and decides to take into account the information gained from the recently received message. This is illustrated in terms of a continuation of the record content step 205' and illustrated in FIGS. 3d, 3e and 3f. By pressing a key 309, the display area 305 is erased and the content of the display area 305 as during the record content step 205 is re-displayed, as illustrated in FIG. 3e. FIG. 3f illustrates the situation at which the user has entered further text during the continued record content step 205'.

By also recognizing messages already stored in the inbox the user is given the opportunity to revise previously read messages before replying or writing to the specific contact.

In case only unread messages are recognised the user is provided with an opportunity to automatically check that he has not forgotten to read any messages possibly containing information relevant for the on going correspondence before sending the message being edited. This further simplifies the process of replying to more than one message using only one message.

In a send message step 215, the reply message is sent to the destination address. Typically, triggering of the sending of the message is performed by way of the user pressing a key 309, as is known in the art.

An alternative to displaying the incoming message, i.e. step 211, by replacing the previous content of the display area 305, as discussed above, is to display a second display area (not shown) on the display 303, provided that the display 303 is sufficiently large and has appropriate spatial resolution.

The invention has been described with only one recipient specified, but it should be understood that it could also be used with multiple recipients/contacts and that the comparison step then compares the contact information of received or recognized messages with all the specified recipient's contact information.

The invention claimed is:

1. A method comprising:
causing display of a first received message from a first sender;
receiving input for a reply message;
causing display of the input;
receiving indication of a second received message during the display of the input;
in an instance in which the second received message is from the first sender, as determined by a processor, causing display of an indication of the second received message; and
in an instance in which the second received message is not from the first sender, as determined by a processor, preventing display of the second received message and continuing to cause display of the input.

2. A method according to claim 1, further comprising:
in an instance in which the second received message is from the first sender, causing display of the second received message.

3. A method according to claim 1, further comprising:
in an instance in which the second received message is from the first sender,
i) receiving indication to erase the input; and
ii) causing the input to no longer be displayed in response to receiving the indication to erase the input.

4. A method according to claim 1, further comprising:
in an instance in which the second received message is from the first sender,
i) receiving indication to continue the reply message;
ii) receiving additional input for the reply message; and
iii) causing display of the additional input.

5. A method according to claim 1, further comprising:
in an instance in which the second received message is from the first sender, causing display of the second received message while continuing to display the input.

6. A method according to claim 1, wherein during the display of the input, the first received message is no longer displayed.

7. An apparatus comprising at least one processor and at least one memory including computer program code, the at least one memory and the computer program code configured to, with the processor, cause the apparatus to at least:
cause display of a first received message from a first sender;
receive input for a reply message;
cause display of the input;
receive indication of a second received message during the display of the input;
in an instance in which the second received message is from the first sender, cause display of an indication of the second received message; and
in an instance in which the second received message is not from the first sender, prevent display of the second received message and continue to cause display of the input.

8. An apparatus according to claim 7, wherein the at least one memory and the computer program code are further configured to cause the apparatus to at least:
in an instance in which the second received message is from the first sender, cause display of the second received message.

9. An apparatus according to claim 7, wherein the at least one memory and the computer program code are further configured to cause the apparatus to at least:
in an instance in which the second received message is from the first sender,
i) receive indication to erase the input; and
ii) cause the input to no longer be displayed in response to receiving the indication to erase the input.

10. An apparatus according to claim 7, wherein the at least one memory and the computer program code are further configured to cause the apparatus to at least:
in an instance in which the second received message is from the first sender,
i) receive indication to continue the reply message;
ii) receive additional input for the reply message; and
iii) cause display of the additional input.

11. An apparatus according to claim 7, wherein the at least one memory and the computer program code are further configured to cause the apparatus to at least:
in an instance in which the second received message is from the first sender, cause display of the second received message while continuing to display the input.

12. An apparatus according to claim 7, wherein during the display of the input, the first received message is no longer displayed.

13. A computer program product comprising at least one non-transitory computer-readable storage medium having computer-executable program code instructions stored therein, the computer-executable program code instructions comprising program code instructions to:
cause display of a first received message from a first sender;
receive input for a reply message;
cause display of the input;
receive indication of a second received message during the display of the input;
in an instance in which the second received message is from the first sender, cause display of an indication of the second received message; and in an instance in which the second received message is not from the first sender, prevent display of the second received message and continue to cause display of the input.

14. A computer program product according to claim 13, wherein computer-executable program code instructions further comprise program code instructions to:

in an instance in which the second received message is from the first sender, cause display of the second received message.

15. A computer program product according to claim 13, wherein computer-executable program code instructions further comprise program code instructions to:

in an instance in which the second received message is from the first sender, i) receive indication to erase the input; and ii) cause the input to no longer be displayed in response to receiving the indication to erase the input.

16. A computer program product according to claim 13, wherein computer-executable program code instructions further comprise program code instructions to:

in an instance in which the second received message is from the first sender, i) receive indication to continue the reply message;

ii) receive additional input for the reply message; and iii) cause display of the additional input.

17. A computer program product according to claim 13, wherein computer-executable program code instructions further comprise program code instructions to:

in an instance in which the second received message is from the first sender, cause display of the second received message while continuing to display the input.

18. A computer program product according to claim 13, wherein during the display of the input, the first received message is no longer displayed.

* * * * *